US006820771B2

(12) United States Patent
Lassota et al.

(10) Patent No.: US 6,820,771 B2
(45) Date of Patent: Nov. 23, 2004

(54) BEVERAGE DISPENSER WITH CENTER OFF-SET DISPENSE TUBE

(75) Inventors: Zbigniew G. Lassota, Long Grove, IL (US); Michael W. Lassota, Bartlett, IL (US); Christopher Nowak, Mundelein, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 13 days.

(21) Appl. No.: 10/118,683

(22) Filed: Apr. 9, 2002

(65) Prior Publication Data

US 2003/0034357 A1 Feb. 20, 2003

Related U.S. Application Data

(63) Continuation-in-part of application No. 09/931,687, filed on Aug. 16, 2001, which is a continuation-in-part of application No. 09/932,572, filed on Aug. 16, 2001, now Pat. No. 6,702,153, which is a continuation-in-part of application No. 09/932,562, filed on Aug. 16, 2001, now Pat. No. 6,619,507, which is a continuation-in-part of application No. 09/930,923, filed on Aug. 16, 2001, now Pat. No. 6,708,598.

(51) Int. Cl.[7] ............................................... B67D 5/06
(52) U.S. Cl. ................................... 222/185.1; 222/462
(58) Field of Search ...................... 222/1, 181.1, 181.2, 222/183, 184, 185.1, 460, 462

(56) References Cited

U.S. PATENT DOCUMENTS

| | | | | | |
|---|---|---|---|---|---|
| 2,377,261 | A | * | 5/1945 | Norris | 222/184 |
| 3,329,317 | A | * | 7/1967 | Greenquist | 222/184 |
| 5,222,631 | A | * | 6/1993 | Hood | 222/131 |
| 5,613,622 | A | * | 3/1997 | Surrena et al. | 222/105 |

* cited by examiner

Primary Examiner—Joseph A. Kaufman
(74) Attorney, Agent, or Firm—James W. Potthast; Potthast & Associates

(57) ABSTRACT

An insulated beverage dispenser (10) with an outer housing (24) having reinforcing cavities (86) and reinforcing ribs (88) on a canted surface (92) of a top closure (78) to resist distortion that is fitted over an integrally formed inner liner (48) in spaced relationship to provide a gap (52) that is evacuated to approximately 8% of standard atmospheric pressure. The bottom closure (62) of the inner liner (48) is symmetrically tilted downwardly across the center to a center-offset drain opening (76) to reduce the lateral extent (137) of a dispense tube (136) to reduce the quantity of beverage contained within the dispense tube (136) and subject to heat loss between the drain opening (76) to and a faucet (20). The dispense tube (136) is protectively contained within a hollow bottom section (25) for purposes of insulation and is also wrapped in foam insulation (139) for further insulation.

36 Claims, 5 Drawing Sheets

BEVERAGE DISPENSER WITH CENTER OFF-SET DISPENSE TUBE

CROSS REFERENCE TO RELATED APPLICATION

This application is a continuation in part of, and claims the benefit under 35 USC 120 of U.S. application Ser. No. 09/931,687 entitled "Beverage Dispensing Urn with Electronic Display; Ser. No. 09/932,572 entitled "Beverage Dispenser with Faucet Assembly now U.S. Pat. No. 6,702,153; Ser. No. 09/932,562 entitled "Beverage Dispenser with Drip Tray Assembly and Method" now U.S. Pat. No. 6,619,507; Ser. No. 09/930,923 entitled "Beverage Dispenser with Cover Assembly and Method" now U.S. Pat. No. 6,708,598, all filed Aug. 16, 2001, and all having the same inventor as the present invention.

BACKGROUND OF THE INVENTION

1. Field of the Invention

This invention generally relates to beverage dispensers, more particularly, to insulated beverage dispensers of the type having a valve for selectively draining beverage from the dispenser and methods of dispensing beverage from such insulated beverage dispensers.

2. Discussion of the Prior Art

It is known to provide commercial beverage dispensers with an insulated, hollow body supported on a base with an inlet opening at the top for receipt of beverage and a operated faucet. In such beverage dispensers the drain hole is generally located at the bottom of the hollow body in a central location equidistant from the peripheral edges of the hollow body. The dispense tube is outside of the body and thus the beverage in the tube is not insulated by the body. If coffee, for instance, is served repeatedly in a relatively rapid fashion, then the lack of insulation does not result in a substantial drop in temperature. However, once service begins with a fresh brew, the dispense tube becomes filled with beverage and remains filled until the container is emptied. During periods between servings, the temperature of the beverage contained in the dispense tube continues to change in a direction toward the ambient temperature. For instance, if coffee is being served, the temperature drops from a high of approximately 200-degrees Fahrenheit and decreases toward room temperature of approximately 70-degrees Fahrenheit. In large dispensers, having a diameter of approximately ten inches, a dispense tube that extends from a center drain hole to the edge of the hollow dispenser body must be at least five inches long and then there must be another inch or more of length to attach the end of the dispense tube to the inlet of the faucet. The diameter of such dispense tubes may be one-half inch or larger, and consequently contain a significant part of a complete serving such needed to fill an eight ounce coffee cup.

Consequently, after a relatively short time the reduced temperature of the beverage contained within the dispense pipe will result in a substantial reduction in the initial temperature of the coffee when first dispensed into a coffee cup. Maintaining the initial temperature of the coffee when first served at or above a preselected temperature is critical for achieving the desired qualities of flavor, taste and aroma, but the inventor has determined that the present designs present a problem in achieving such qualities for the reasons noted above

SUMMARY OF THE INVENTION

It is therefore the general object of the invention to provide an insulated beverage dispenser and method of dispensing that overcomes the problems with known insulated beverage dispensers.

This objective is achieved in part by providing a beverage dispenser with a container body with a top, a bottom and a center, a top closure for closing the top of the container body except for an inlet opening for receipt of beverage, a bottom closure for closing the bottom of the container body except for a dispense opening for draining of beverage from within the container body, said dispense opening being spaced from the center and located between the center of the container body and a peripheral edge of the bottom closure.

Preferably, the bottom closure asymmetrically slopes downwardly away from the center and toward the dispense opening to drain beverage to the dispense opening. A part of the bottom closure that is farthest from the top is located adjacent the dispenser opening and spaced from the center. A dispense tube is connected to the dispense opening to direct beverage from the dispense opening to a faucet. The dispense tube is generally L-shaped and extends from the dispense outlet toward a portion of the peripheral edge of the inner container body that is generally closest to the dispense outlet opening. Preferably, the dispense tube is protectively contained within an insulating bottom section and is wrapped in insulation.

The objective is also achieved by providing in a beverage dispenser having an insulated hollow body for thermally insulating the beverage contained within the hollow body and having a center, a faucet for selectively dispensing beverage, a method of passing beverage from the hollow body to the faucet by performing the steps of passing the beverage to an off-center dispense opening at the bottom of the hollow body that is spaced from the center of the hollow body, passing the beverage through a dispense tube extending from the off-center dispense opening to a peripheral edge of the body that is substantially closest to the drain hole, and passing the beverage from the dispense tube to the faucet.

BRIEF DESCRIPTION OF THE DRAWINGS

The foregoing object and advantageous features of the present invention will be described in detail and other advantageous features will be made apparent from a detailed description of a preferred embodiment of the beverage dispenser of the present invention that is given with reference to the several figures of the drawing, in which.

DETAILED DESCRIPTION

Figure 2:
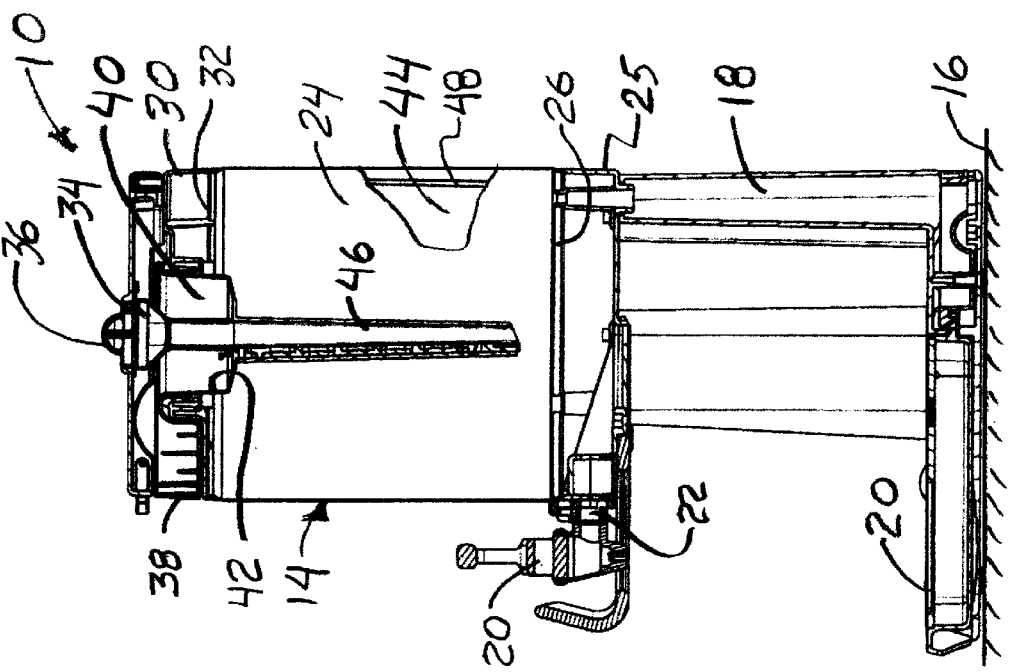
FIG. 2 is a side elevation section view of the vacuum insulated beverage dispenser of the present invention taken along section line II—II of FIG. 1.
Figure 1:
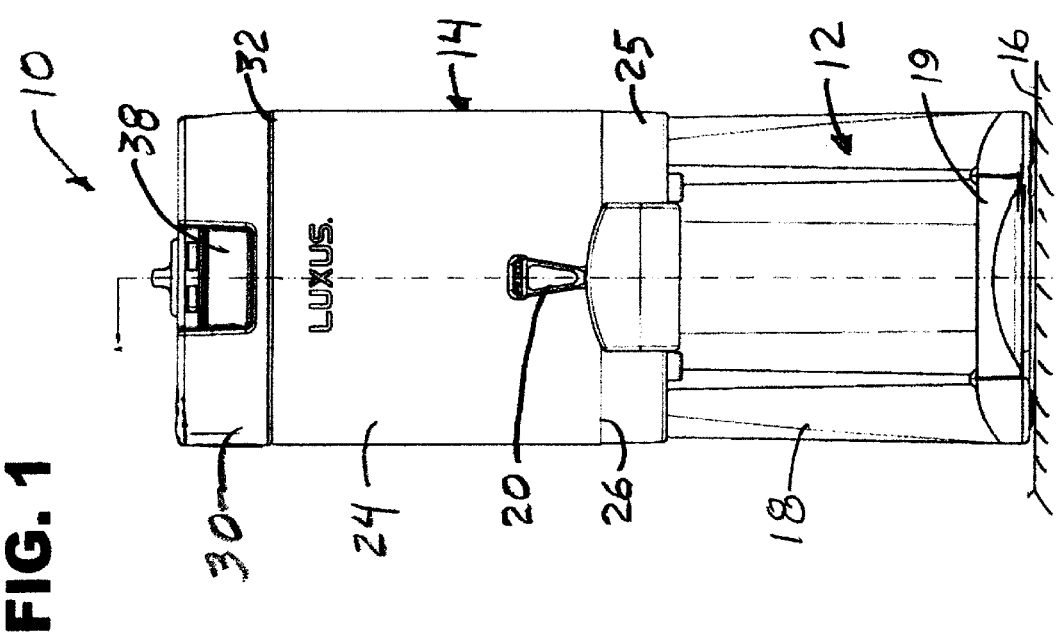
FIG. 1 is a front elevation view of a vacuum insulated beverage dispenser of the present invention.

Referring to FIGS. 1 and 2, an embodiment of the vacuum insulated beverage dispenser assembly 10 of the present invention is seen to include a base 12 supporting a cylindrical dispenser body 14 above a support surface 16 such as a counter top or top of a serving cart. The base 12 includes a plastic leg section 18 underlying a rearward portion of the dispenser body 14 and a drip tray assembly 19 extending forwardly of the leg section 18 to provide support against forward tipping of the dispenser body that is cantilevered over the drip tray assembly 19. The drip tray assembly 19 provides a surface beneath a nozzle of a faucet 20 for temporary support of a cup or other serving container during dispensing of the beverage, such as hot coffee. The faucet 20 is connected to the outlet end of a metal dispense tube 22 that is in fluid communication with the interior of the dispenser body 14. The dispense tube 22 extends laterally outwardly from the side of a cylindrical hollow bottom section 25 to connect with and cantilever support the faucet 20 at the front of the bottom section 25. The cylindrical dispenser body 14 includes a vacuum insulated, stainless steel, beverage urn with a stainless steel outer housing 24 that envelopes an inner, stainless steel liner 48. The dispenser body also includes a bottom section 25 secured to the bottom of the outer housing 24 and a top section 30 attached to the top of the outer housing 24. The outer housing 24 and the inner liner 48 are shown in and described in detail with reference to FIGS. 3–8.

Still referring to FIGS. 1 and 2, the hollow, insulating plastic section 25 is attached by threaded fasteners to the bottom 26 of the outer housing 24. The bottom body section 25 in turn is secured the top of the leg section 18 to provide underlying support for the beverage urn 14. The plastic cylindrical top section 30 is attached to a top 32 of the outer housing 24 by fasteners, and carries a funnel assembly 34, a funnel closure member 36 and a visual beverage status display 38. The funnel assembly 34 has an insulating mounting collar 40 surrounding the funnel that fits through a central opening in the top section 30 and through a mating top opening 42 of the outer housing 24 and into the interior 44 of the dispenser body 14. In the case of a hot beverage, a down-tube 46 passes the beverage from the funnel to adjacent the bottom of the interior of the dispenser body 24.

For further details with respect to the above and other features of the beverage dispenser reference should be made to one or more of the following patent applications which are hereby incorporated by reference: U.S. application Ser. No. 09/931,687 entitled "Beverage Dispensing Urn with Electronic Display; Ser. No. 09/932,572 entitled "Beverage Dispenser with Faucet Assembly; Ser. No. 09/932,562 entitled "Beverage Dispenser with Drip Tray Assembly and Method"; Ser. No. 09/930,923 entitled "Beverage Dispenser with Cover Assembly and Method", all filed Aug. 16, 2001, and all having the same inventor as the present invention.

Figure 3:
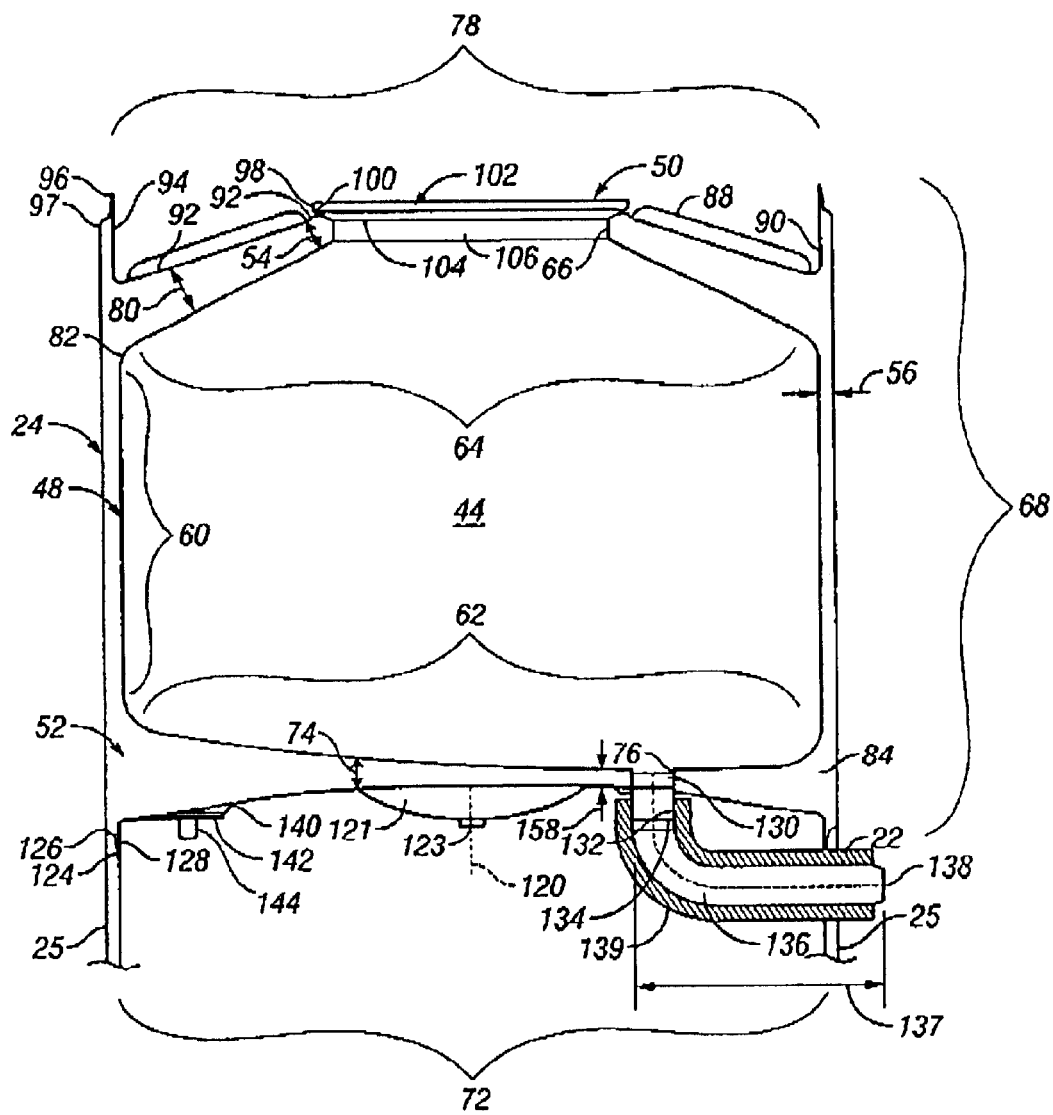
FIG. 3 is a side elevation section view of the vacuum insulated beverage container of the beverage dispenser of FIGS. 1 and 2.

Referring now to FIG. 3, a vacuum insulated beverage container, or vacuum insulated beverage dispensing urn, 50 is seen to include an inner liner 48 contained within the outer housing 24. Both the inner liner 48 and the outer housing 24 are preferably made of 300-Series stainless steel, such as 303-stainless steel, having a thickness of approximately 24-gage, plus or minus 10%. It has been found that because of the structural reinforcement elements of the invention this thickness of steel provides sufficient strength to withstand the pressures created by evacuation of the evacuated gap 52 between the inner liner 48 and the outer housing but yet is sufficiently light weight to enable manual manipulation for purposes of moving into and out of brewed beverage receiving position beneath a coffee brewer and to remote serving locations and for purposes of cleaning. The stainless steel vacuum insulated urn 48 does not readily absorb food, etc. and is therefore approved for use with beverages such as milk and juice in addition to use with brewed beverages such as coffee and tea. The evacuated gap 52 is preferably evacuated to approximately 8% of atmospheric pressure or less. The gap 52 is approximately one quarter inch at the thinnest section 54 at the top of the urn 52, approximately one half inch at sections 56 at the sides of the urn and approximately three quarters at the thinnest segment 158 at the bottom of the urn. The hollow body bottom section 25 and the top section 30 with the funnel closure member 36 also help insulate the interior of the urn 50. While stainless steel of this type and thickness has been found suitable for an urn having a diameter of approximately eight to nine inches, for urns of a larger diameter a larger thickness may be required.

Referring to FIG. 3, the inner liner 48 of the urn 50 has a generally tubular, cylindrical, hollow liner body 60, a bottom closure 62 and a top closure 64 with an inlet opening 66 that is aligned directly beneath the top opening 42 and receives the insulating funnel collar 40, FIG. 2. The inlet opening 66 advantageously is sufficiently large to enable manual access to the interior of liner 48. The inner tubular body 60, the top closure 64 and the bottom closure 62 are integrally made of a single piece of molded steel, preferably 300-series stainless steel, preferably 303-stainless steel. The outer housing 24 has a tubular, cylindrical hollow housing body 68 which envelopes the cylindrical liner body 60 of the inner liner 48. A housing bottom closure 72 that is relatively larger than the liner bottom closure 62 closes the bottom of the cylindrical housing body 68 and is spaced from the liner bottom closure 62 to provide a variable bottom gap 74. The thinnest part 158 of the gap 74 is adjacent the lowest part of the liner bottom closure 62 next to an outlet opening 76.

The top closure 78 carries the top opening 42 in a central position that is generally aligned directly above the inlet opening 66 and is spaced from the inner liner top enclosure 64 to define a variable width gap 80. Because the housing top enclosure and bottom enclosure are relatively larger than the liner top closure and the liner bottom closure there are also gaps at the junctures 82 and 84 of the closures with the tubular bodies and all of the gaps are in communication with one another so that there is a continuous evacuated gap surrounding the entire liner. Advantageously, this enables evacuated all of the gaps with a single evacuation process. In any event, the outer housing 24 envelopes the inner cylindrical liner 48 in spaced relationship to form an evacuated gap between each of the tubular bodies, the bottom closures and the top closures.

Figure 4:
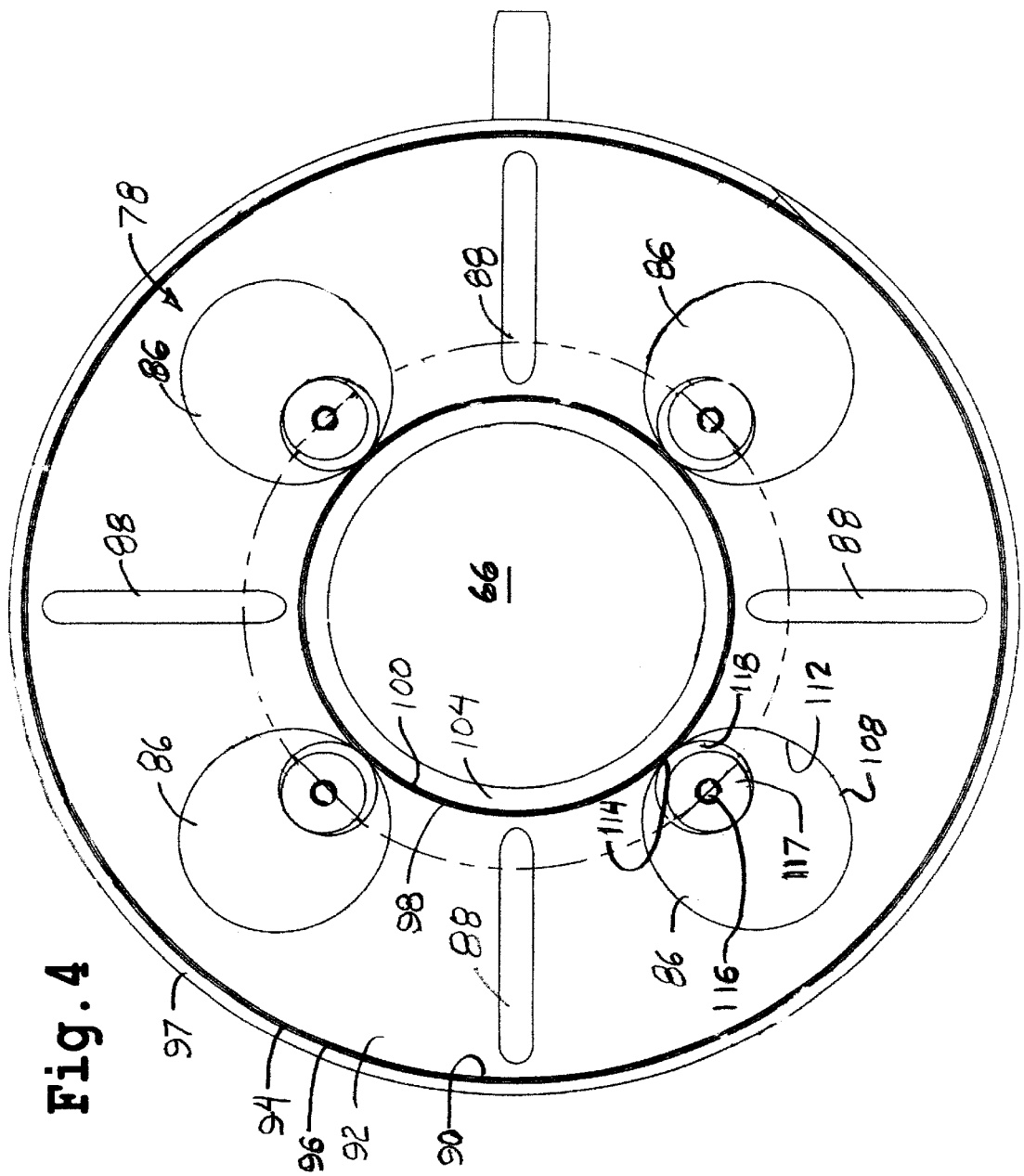
FIG. 4 is a plan view of the top of the vacuum insulated beverage container of FIG. 3.

Referring also to FIG. 4, in accordance with one aspect of the invention, a plurality, preferably at least four, substantially identical inwardly extending reinforcement cavities 86 are formed in the top closure 78 to strengthen the top closure 78 against inward bowing from net pressure created by evacuation of the evacuated gap 52. In accordance with another aspect of the invention, the top housing closure 78 has a plurality, preferably four, substantially identical elongate reinforcement, or stiffening, ribs 88 on the top closure 78. The ribs 88 radiate outwardly from the top opening 42 and toward a surrounding outer edge 90 joined to the outer tubular housing body 24 to strengthen the top closure 78 against inward bowing or other distortion from net pressure created by evacuation of the evacuated gaps.

The top closure 78 has a canted surface top surface 92 that extends outwardly and downwardly from the top opening 42 to the surrounding outer edge 90 that is preferably configured as a truncated cone. The canted top surface 92 is joined at edge 90 to an upturned cylindrical collar 94. The upper end of the upturned collar 94 is joined by a weld to an inwardly extending mounting collar 96 at the top of the outer tubular housing body 68 to help strengthen the top closure 78 against bowing or other distortion from net pressure created by evacuation of the evacuated gaps. The mounting collar 96 is supported in an inward position relative to the outside surface of the cylindrical housing body 68 by a truncated conical shoulder 97 that extends inwardly and upwardly from the top of the cylindrical wall of the body 68 for welded attachment to the inwardly located top of the upturned collar 94. The outwardly canted surface 92 is joined to the upturned mounting collar 94 at a location adjacent to but spaced beneath the mounting collar 96 at top end of the tubular housing body 68 to help strengthen the top closure 78 against bowing or other distortion due to net pressure created by evacuation of the evacuated gap 80 or otherwise. The perimeter mounting collar 94 is attached to the interior surface of the outer housing 24 at a level that is substantially the same as the top opening surrounded by collar 100. This level arrangement enables a snug fit of the top section 30 to the top of the vacuum insulated urn 50. The internally threaded fastener 144 extends beneath this level for receipt of a mating fastener.

An upwardly extending cylindrical mounting collar 98 surrounds the top opening 42. Within the mounting collar 98 is received and fixedly attached by weld joint a top cylindrical mounting collar 100 of a collar assembly 102 surrounding the inlet opening 66. The mounting collar 100 is supported above the inlet opening 66 by a truncated conical neck 104 with a relatively narrow opening connected to the top of a reinforcing collar 106. The bottom of the reinforcing collar 104 snugly surrounds and strengthens the inlet opening 66. A relatively wider diameter of the mounting collar provides space for a resilient sealing member (not shown) that is seated upon the conical surface of the conical neck 104 and has an interior diameter substantially the same as the inlet opening 66 and the reinforcing collar 106. This seal member (not shown) seals the outside insulating funnel collar 40 against the escape of heat air and steam from the interior 44. The top of the upturned, inwardly mounting collar 94 and the top of the inwardly extended mounting collar 96 are both at substantially the same level as the top of the seal ring mounting collar 102. This enables a level fit of the top section 30 on top of the outer housing 24, as shown in FIG. 2. A fastener 116 extends above this level for connection with a mating fastener.

Figure 5:
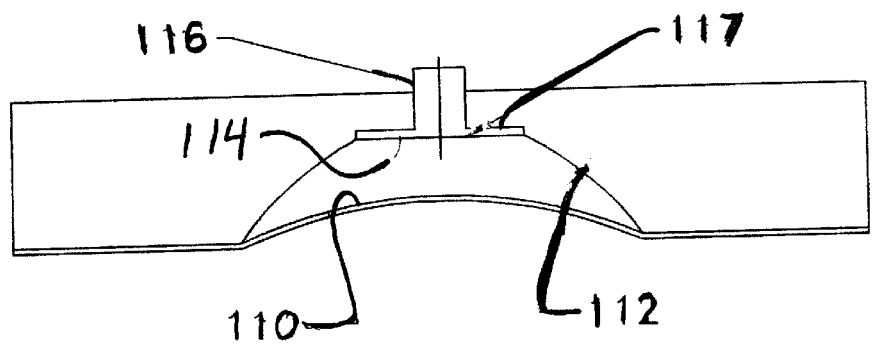
FIG. 5 is a sectional side view of one of the reinforcement cavities taken through section line V—V of FIG. 4.
Figure 6:
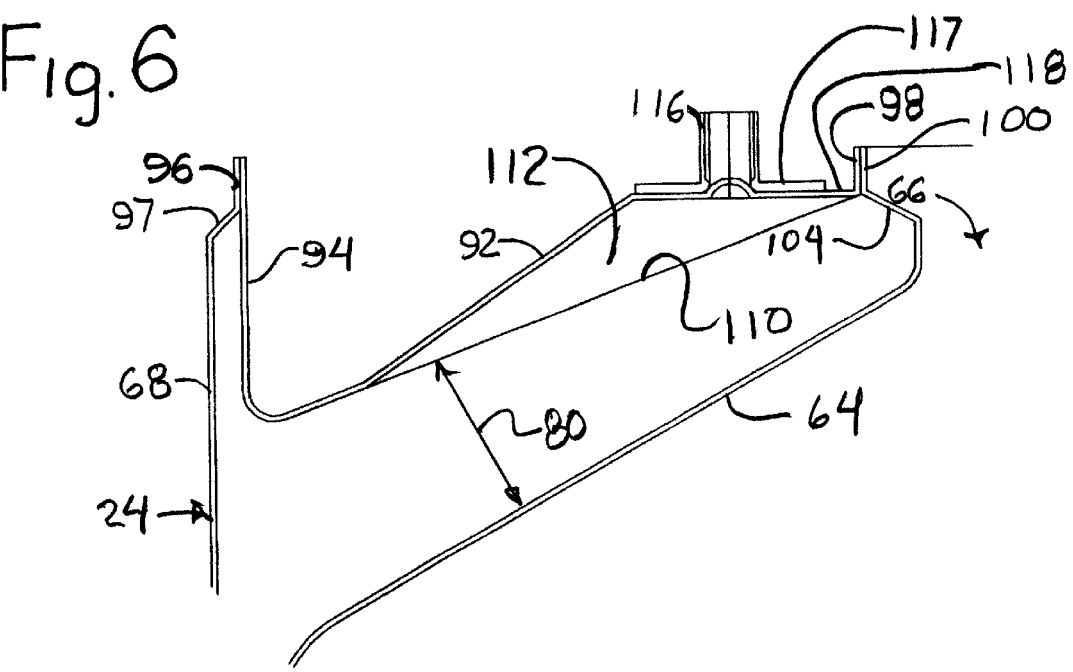
FIG. 6 is a sectional side front view of one of the reinforcement cavities taken through section line VI—VI of FIG. 4.

As seen in FIG. 4, and also referring to FIGS. 5 and 6, the reinforcement cavities 86 are formed adjacent the inlet opening 66 and abut the mounting collar 98 and radiate from the center across most of the canted surface 92. The each one of the reinforcement cavities is at least partly arcuate, with a substantially circular, but slightly elliptical or egg-shaped, perimeter edges 108 at the top of the canted surface 92. The cavities have upwardly curved, downwardly slanted bottoms 110 and side surfaces 112 that extend downwardly to meet the bottom surfaces 110, as shown by FIGS. 5 and 6, and have a circular, elliptical or parabolic shapes. Adjacent the top opening 66 is located a generally vertical, or other upwardly extending, reinforcement wall 114, or a slanted or curved wall with a substantial vertical component. Of course, all of the sidewalls 112 above the lowest surface of the cavity 86 have a vertical component and supplement the stiffening provided to the top closure 78 by the reinforcement wall 114 against inward pressure forces due to gap evacuation and other forces with a vertical direction.

Figure 7:
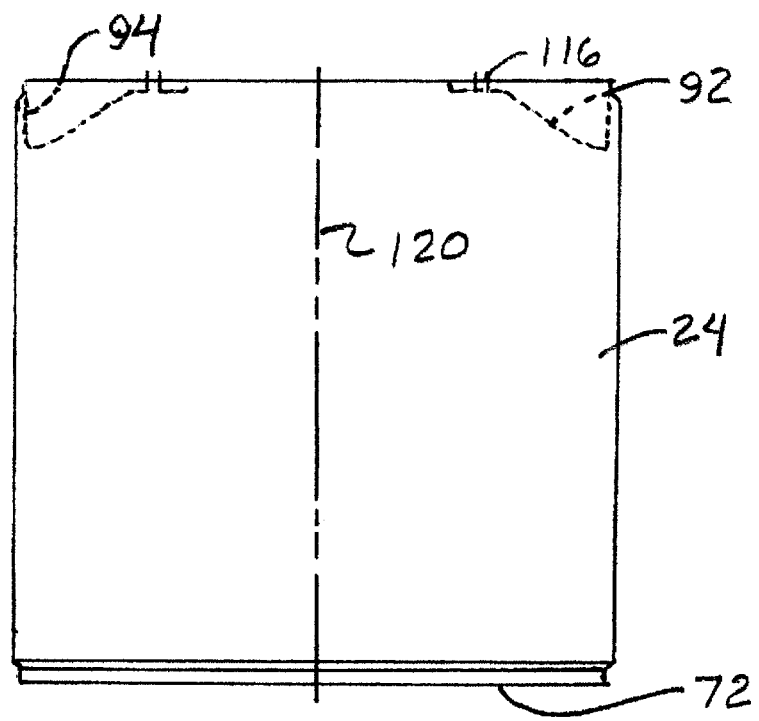
FIG. 7 is a sectional side view of one of the reinforcement cavities of FIG. 4.

An upstanding fastener, such a threaded stud, 116 mounted on a spot welded base 117 extends vertically upwardly from an upwardly facing, substantially horizontal, surface 118 adjacent the top opening 66 and elevated above the bottom of the arcuate surface 110 of each of the reinforcement cavities 86. The fasteners 116 extend upwardly above the top of the top of the urn 50, to a position outside of the top of the cavity, as shown in FIG. 7, for attachment with the top cover 30 overlying the top closure 78 by means of mating fasteners, such as threaded nuts. The upwardly facing surface is substantially flat, circular and tangent to the wall 114 and the innermost edge of the perimeter 108, adjacent the inlet opening 66. As seen in FIG. 6, the arcuate surface 110 extends downwardly and away from the upward facing, substantially flat surface 118. Each fastener extends upwardly to a location outside of the cavity from which the fastener extends. The fastener base 117 is integrally formed with the threaded fastener and the fastener base 117 is spot-welded to the upwardly facing surface 118.

As best seen in FIG. 4, the plurality of reinforcement cavities 86 are equally distributed around the inlet opening 66 of the outer housing 24. Preferably, there are at least four reinforcement cavities surrounding the inlet opening although a lesser number may be adequate. Preferably the number of elongate ribs 88 on the top closure 78 is equal to the number of reinforcement cavities 86 so that one rib may be located equidistant between each pair of adjacent reinforcement cavities. The plurality of ribs 86 are integrally formed in the top closure 78 such as by molding and preferably extend upwardly from the surrounding canted surface 92 of the ribs 88. The ribs 88 extend, and preferably radiate, outwardly between the inlet opening 66 and the outer perimeter or edge 90, and are adjacent with the collar 98, but are not contiguous with either the collar 98, like are the reinforcement cavities 86, or with the edge 90. Instead, the opposite ends of the reinforcing ribs are equally spaced from the collar 98 and the edge 90 by an approximate amount shown in FIG. 4.

The tubular body 68 has a center axis of symmetry 120, and the canted surface 92 forms an angle with the axis of symmetry of approximately seventy degrees. The canting and associated mounting elements strengthen the surface against flexing and distortion from outside pressures pressing inwardly against the top closure 78. The ribs 88 being parallel to the surface 92 and being of uniform thickness are slanted by the same degree as that of the canted surface 92. Alternatively, the ribs may be thicken closer to the edge 90 in which case the top surfaces may be slanted at an angle less than that of the canted surface 92. While the canted surface 92 is preferably has the shape of a truncated cone an outwardly curved surface may also function to strengthen the top closure against inward bowing.

Referring to FIG. 3, again, the top closure 64 of the inner liner 48 is also canted downwardly and outwardly like the canted surface 92 but at a steeper angle. Preferably, the slant or angle of the top closure 64 of the inner liner 48 forms a nonzero, acute angle with the canted surface 92 of the top closure 78 of the outer housing 24. The acute angle is approximately ten degrees and is no less than approximately eight degrees. This canting of the top closure 64, which is approximately sixty degrees relative to vertical enables condensation formed on the inside of the top closure 64 to slide down the interior of the canted surface of the top closure 64 and onto the interior cylindrical walls of the body 60. This also eliminates sharp corners and facilitates manual access to the interior of the top closure 64 through the opening 66. Thus, both of the top closures 78 and 64 are reinforced against distortion by their conical or canted configurations and by the doubled wall construction with welds at the collar assembly 102 and the upturned collar 94.

Figure 8:
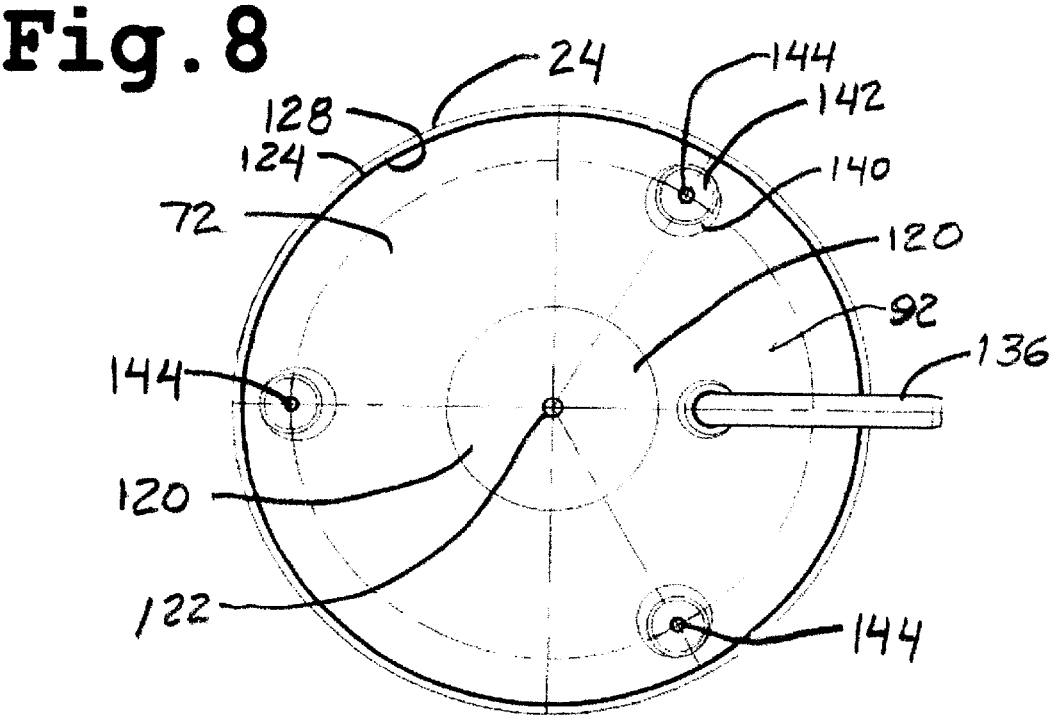
FIG. 8 is a bottom view of the vacuum insulated beverage container of FIG. 3.

Referring to FIG. 8 and also still to FIG. 3, the housing bottom closure 72 is generally inwardly concave to help strengthen the bottom closure 72 against inward bowing from net pressure created by evacuation of the evacuated gap 52. A central dome-like portion 120 has a closed evacuation opening 122 through which air is evacuated from the gap 52 to help strengthen the bottom closure against inward bowing. After the evacuation process has reached the desired the level the opening is closed by being pinched closed and then braised, or welded, and then capped with epoxy cement plug 123.

The bottom of outer housing 24 has an inwardly located and downwardly extending mounting collar 124 supported at the end of an inwardly extending conical neck 126. The mounting collar is welded to a downwardly extending matching mounting collar 128 at the periphery of the bottom closure 72. The drain hole, or outlet opening 76 is located at the lowest part of the bottom closure 62 of the inner liner, and as best seen in FIG. 3, the outlet opening 76 is located at a position that is offset from the center axis 120 by a substantial amount. An outlet pipe stub 130 is welded at one end to a downwardly extending collar surrounding the outlet opening 76 and is received within and welded to a downwardly extending collar surrounding an aligned outlet opening 132 in the housing bottom closure 72. An L-shaped dispense tube 136 is then fastened to a distal end 134 of the stub 130 that is approximately aligned with the bottom of mounting collar 128. The L-shaped dispense tube 136 extends radially outwardly from beneath the aligned outlet openings 76 and 132 and the end 134 to a location spaced laterally from the housing body 24 to a distal end 138. The end passes through an opening in the front of the bottom section 25, as seen in FIG. 2, for releasable connection with the faucet assembly 20. The base 25 provides some insulation for the beverage in the dispense tube 136 and the stub 130, but since the stub 130 and the dispense tube are both made of metal, preferably stainless steel, as noted above, for purposes of cleanliness, strength and durability, they are also highly heat conductive.

In accordance with the invention, the outlet openings 76 and 132 are spaced from the center 120, such that the lateral run 137 of the L-shaped tube 136 is shorter than it would be if the dispense openings 76 and 132 were located at the center as in known dispensers, and thus there is less heat loss than if the lateral run had to extend all the way from the center to the peripheral edge as in known beverage dispensers. The lateral section of the L-shaped dispense tube 136 radiates to the front of the housing tubular body 24 which is the closest side to the outlet openings 76 and 132. The interior surface of the bottom closure 62 of the inner liner 48 slopes asymmetrically downward to the lowest level adjacent to the dispense opening 76 and spaced from the center 120 to facilitate complete draining without the formation of puddles of beverage on the bottom. All sharp corners are avoided in the configuration of the inner liner 48 to facilitate draining and cleaning with rounded corners between the top closure and the bottom closure with the cylindrical body 60 of the inner liner 48.

Still referring to FIG. 8 and FIG. 3, the outside of the bottom closure has a plurality, preferably three, equally spaced generally flat, horizontal fastener mounting surfaces 140 adjacent the perimeter to which are spot welded bases 142 that space downwardly extending threaded fasteners 144. These fasteners 144 are used to releasably attach the insulating bottom section 25 to the bottom closure 72. As best seen in FIG. 2, the bottom section has a flat circular top that is snugly fitted around the mounting collars 124 and 128, FIG. 3, and pressed against the inwardly slanted neck 126 when nuts are tightened down on the fasteners 144. The bottom of the bottom section 25 is closed, and an opening in the front though which the dispense tube 22 passes for connection of the distal end 138 with the inlet to the faucet 20 provides a close fit to reduce the movement of any air in the space between the bottom 26 of the urn 50 and the bottom of the bottom section 25 The bottom section is preferably made of a durable, impermeable, relatively rigid, insulating plastic. Thus, the bottom section helps to insulate the dispense tube 22 to reduce the rate of cooling of the beverage remaining in the dispense tube 22, while the shortening of the dispense tube to approximately half the length of dispense tubes in known beverage dispensers substantially reduces the quantity of beverage contained in the dispense tube 22. If desired, additional foam or other insulation is wrapped around the vertical run 137 of the dispense tube 22 to provide additional insulation.

The method of the present invention of passing beverage from the hollow body to the faucet is performed by passing the beverage to an off-center dispense opening at the bottom of the hollow body that is spaced from the center of the hollow body, passing the beverage through a dispense tube extending from the off-center dispense opening to a peripheral edge of the body that is substantially closest to the drain hole, and passing the beverage from the dispense tube to the faucet. Preferably, the beverage is insulated within the dispenser tube by passing the dispense tube through a hollow, insulating bottom section attached to the bottom of the container. In addition, the step of insulating the beverage is performed by passing it through an outlet pipe extending through an insulated gap between the drain hole in the container and an outer protective housing enveloping the container and the dispense tube. Preferably, off-center dispense opening is located is located no closer than midway between the center and the peripheral edge. The faucet is cantilever mounted to the end of a dispense tube extending from the off-center dispense opening to past the peripheral edge and is preferably adjacent the side of the bottom section.

The beverage dispenser 10 is first constructed by assembling the evacuated urn 50 and then attaching the top section 30 and the bottom section 25 to the urn 50 using the fasteners at these locations. Then the bottom section 25 is mounted to the base 12.

The inner liner 48 is preferably made of a single piece of cast metal, preferably 303-stainless steel having a thickness of approximately one-quarter inch. The stub 130 is welded in place to the inner liner as shown in FIG. 3. The mating collar 96 is welded to the top of the upstanding member 94 to attach the top closure member 78 to the top of the tubular body 68. This subassembly is then lowered over the top of the inner liner 48, aligned and positioned with the collar 100 of the inner liner 48 fitted within the opening surrounding mounting collar 96 of the top closure 78 of the outer housing 24. The mounting collars 98 and 100 are then welded together. The bottom closure member is then fitted to the bottom of the tubular body 68 with the mounting collar 126 of the bottom closure 72 received within the opening surrounded by the mounting collar 124 of the outer housing 24 and the stub received through the mounting collar 132. The mounting collars 124 and 128 are welded together and the mounting collar 132 is welded to the side of the stub 130. All of these welds hold the inner liner 48 in spaced relationship from the housing 24 to provide the gap 52 as shown in FIG. 3. An evacuation pump is then connected to a collared hole at the bottom of the central convex section 120 of the bottom closure 72 shown closed by plug 123. After the evacuation is complete, the hole is closed with a weld and an epoxy plug 123. The gap 52 is preferably evacuated to no more than approximately 8% of standard atmospheric pressure. The L-shaped dispense tube 136 is then welded to the distal end 134 of the stub 130. The bottom section 25 and the top section 30 are attached to the bottom closure 72 and the top closure 78 using the associated fasteners. The bottom section 25 is then attached to the top of the leg section 18 of the base 12. All welds use stainless steel rod.

While a particular embodiment of the beverage dispenser has been disclosed in detail, it should be appreciated that many changes may be made and equivalents substituted for some of the elements without departing from the scope of the invention as defined in the appended claims. For instance, while the use of stainless steel for all of elements of the vacuum insulated urn 50 is preferred, other metals that do not interact with coffee like beverages could also be used, such as titanium alloys. With the use of only stainless steel the urn 50 is stronger than one with a glass liner and because of the elimination of corners, a sloped bottom and a clear drain pipe also made of stainless steel, the urn 50 is suitable to use for dispensing beverages such as milk and juice. If such use is not contemplated, then even air impermeable plastic material may be used for the urn material. Also, while the dispense opening is shown being located approximately half way between the center of the dispenser body and the peripheral edge, it could be located closer to the peripheral edge or closer to the center with greater and lesser effect.

What is claimed is:

1. A beverage dispenser, comprising:
    a double-walled container body with a top, a bottom and a center, and an inner body and an outer body protectively surrounding and fixedly attached to the inner body in spaced relationship to form a permanent insulating gap;
    a top closure for closing the top of the container body except for an inlet opening for receipt of beverage;
    a bottom closure for closing the bottom of the container body except for a dispense opening for draining of beverage from within the container body, said dispense opening being spaced from the center and located between the center of the container body and a peripheral edge of the bottom closure.

2. The beverage dispenser of claim 1 in which the bottom closure asymmetrically slopes downwardly away from the center and toward the dispense opening to drain beverage to the dispense opening.

3. The beverage dispenser of claim 1 in which a part of the bottom closure that is farthest from the top is located adjacent the dispenser opening and spaced from the center.

4. The beverage dispenser of claim 1 including a dispense tube fixedly connected to the dispense opening to direct beverage from the dispense opening to a faucet.

5. The beverage dispenser of claim 4 in which the dispense tube is generally L-shaped and extends from the dispense opening toward a portion of the peripheral edge of the inner container body that is generally closest to the dispense opening.

6. The beverage dispenser of claim 5 in which the dispense tube has a generally radially extending section that extends from a downwardly extending section and has a section of length between the center and the peripheral edge that is substantially less than a distance from the center to the peripheral edge.

7. The beverage dispenser of claim 4 including a bottom section made of insulating material that is fixedly attached to the bottom of the container with a cavity for insulating receipt of the dispense tube.

8. The beverage dispenser of claim 7 in which the bottom section has a sidewall and an opening for passage of the dispense tube from within the cavity to outside of the cavity.

9. The beverage dispenser of claim 7 in which the insulating material is a plastic.

10. The beverage dispenser of claim 7 in which the bottom of the container slopes downwardly toward the dispense opening and is received within the bottom section, said bottom section having a cylindrical side wall extending between a generally flat bottom and a flat top.

11. The beverage dispenser of claim 4 in which both of the dispense tube and the container are made of stainless steel and the dispense tube is attached to the container by a weld joint.

12. The beverage dispenser of claim 1 in which said dispense opening has a drain hole located in the inner liner including an outlet tube passing through the gap from the drain hole to an outlet hole in the outer housing and aligned with the drain hole to pass beverage, said gap being insulated to insulate the outlet gap and beverage contained within the outlet tube.

13. The beverage dispenser of claim 12 including a dispense tube fixedly connected to the outlet tube and extending from the outlet tube through a bottom section attached to the bottom of the container for insulating the dispense tube and the beverage contained within the dispense tube.

14. The beverage dispenser of claim 1 in which the dispense opening is located more than half of the distance between the center and the peripheral edge closest to the center.

15. The beverage dispenser of claim 1 including a bottom section fixedly attached to the bottom and providing a supporting base for the container body, said bottom section having an insulated cavity for insulating receipt and support of the dispense tube with an inlet end fixedly connected to the container body for passing beverage from the dispense opening to a distal outlet end of the dispense tube.

16. The beverage dispenser of claim 15 in which the bottom section has a sidewall with an opening for passage of the dispense tube from within the insulated cavity to an exterior of the sidewall outside of the cavity.

17. The beverage dispenser of claim 15 in which the bottom section is made from plastic or other like insulating material.

18. The beverage dispenser of claim 17 in which the bottom of the container slopes downwardly toward the dispense opening and is received within the bottom section, said bottom section having a cylindrical side wall extending between a generally flat bottom and a flat top.

19. The beverage dispenser of claim 15 in which both of the dispense tube and the container are made of stainless steel and the dispense tube is permanently attached to the container by a weld joint.

20. The beverage dispenser of claim 15 in which the dispense tube is connected to the outlet opening and extending from the outlet opening through a bottom section attached to the bottom of the container for insulating the dispense tube and the beverage contained within the dispense tube.

21. The beverage dispenser of claim 1 including
    a bottom section with a sidewall extending between a bottom member and a top for providing an underlying base for the container body,
    means for permanently attaching the bottom of the container body to the top of the bottom section, a dispense tube fixedly connected to the dispense opening and extending from the dispense opening and to an opening in the sidewall, said bottom section insulating the dispense tube and the bottom of the container body, and additional insulation material surrounding the dispense tube within the bottom section.

22. A beverage dispenser, comprising:

a container body with a top, a bottom and a center;

a top closure for closing the top of the container body except for an inlet opening for receipt of beverage;

a bottom closure for closing the bottom of the container body except for a dispense opening for draining of beverage from within the container body, said dispense opening being spaced from the center and located between the center of the container body and a peripheral edge of the bottom closure; and an outer container body enveloping and sealed to an inner container body in spaced relationship to provide a gap sandwiched between the inner container body and the outer container body, and in which both of the outer container body and the inner container body are made of relatively rigid metal and the gap is evacuated.

23. The beverage dispenser of claim 22 in which the top closure has a thin walled body with an outside surface and reinforcing members on the outside surface.

24. The beverage dispenser of claim 23 in which the reinforcing members includes elongate reinforcing ribs.

25. The beverage dispenser of claim 24 in which the elongate reinforcing ribs extend lengthwise in a direction radially outwardly away from the inlet opening and toward a periphery of the top closure member.

26. The beverage dispenser of claim 24 in which the reinforcing ribs extend upwardly from the thin walled body of the top closure.

27. The beverage dispenser of claim 24 including a reinforcing wall that extends upwardly from the thin walled body and is located between two adjacent reinforcing ribs.

28. The beverage dispenser of claim 27 in which the reinforcing wall is arcuate.

29. The beverage dispenser of claim 23 in which the reinforcing ribs are integrally formed with the top closure.

30. The beverage dispenser of claim 22 in which the top closure has a thin-walled body and reinforcing walls on the thin walled body.

31. The beverage dispenser of claim 30 in which the reinforcing walls are integrally formed in the thin walled body.

32. The beverage dispenser of claim 30 in which the reinforcing walls are arcuate.

33. The beverage dispenser of claim 32 in which the reinforcing walls have a generally crescent shape.

34. The beverage dispenser of claim 30 in which the thin walled body has a generally truncated conical shape and extends upwardly away from bottom and toward the inlet opening and the reinforcing walls extend in a direction generally parallel to the elongate direction of the outer container body.

35. A beverage dispenser, comprising:

a container body with a top, a bottom and a center;

a top closure for closing the top of the container body except for an inlet opening for receipt of beverage;

a bottom closure for closing the bottom of the container body except for a dispense opening for draining of beverage from within the container body, said dispense opening being spaced from the center and located between the center of the container body and a peripheral edge of the bottom closure;

a dispense tube connected to the dispense opening to direct beverage from the dispense opening to a faucet, said dispense tube being generally L-shaped and extending from the dispense outlet toward a portion of the peripheral edge of an inner container body that is generally closest to the dispense outlet opening;

an outer container body that envelopes the inner container body and is spaced from the inner container body to provide an evacuated insulated gap between the inner container body and the outer container body; and a downwardly directed section of the dispense tube that extends downwardly through the evacuated insulated gap.

36. A beverage dispenser, comprising:

a container body with a top, a bottom and a center, said container having a double walled construction with an inner liner enveloped by and fixedly attached to an outer housing to form a gap;

a drain hole located in the inner liner that is offset from the center;

an outlet hole located in the outer housing that is offset from the center and aligned with the drain hole;

an outlet tube respectively fixedly attached at opposite ends to the inner liner and the outer housing and passing through the gap from the drain hole to the outlet hole to pass beverage, said outlet tube being insulated by the insulating material permanently contained within the gap; and a top closure for closing the top of the container body except for an inlet opening for receipt of beverage.

* * * * *